(12) United States Patent
Fischer et al.

(10) Patent No.: US 9,114,780 B2
(45) Date of Patent: Aug. 25, 2015

(54) PRETENSIONER DEVICE FOR A SEAT BELT

(71) Applicant: Autoliv Development AB, Vargarda (SE)

(72) Inventors: Christian Fischer, Hamburg (DE); Martin Schmidt, Elmshorn (DE); Matthias Steinberg, Kiebitzreihe (DE); Michael Pech, Hamburg (DE); Tobias Voss, Klein Nordende (DE); Thomas Schmidt, Timmendorfer Strand (DE); Simone Mesecke-Rischmann, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 260 days.

(21) Appl. No.: 13/669,726

(22) Filed: Nov. 6, 2012

(65) Prior Publication Data

US 2013/0062450 A1 Mar. 14, 2013

Related U.S. Application Data

(63) Continuation-in-part of application No. 13/505,164, filed as application No. PCT/EP2010/006227 on Oct. 12, 2010.

(30) Foreign Application Priority Data

Oct. 30, 2009 (DE) .......................... 10 2009 051 451

(51) Int. Cl.
*B65H 75/48* (2006.01)
*B60R 22/46* (2006.01)

(52) U.S. Cl.
CPC ..... *B60R 22/4628* (2013.01); *B60R 2022/4642* (2013.01)

(58) Field of Classification Search
USPC .................... 242/374; 60/632–638
See application file for complete search history.

(56) References Cited

U.S. PATENT DOCUMENTS

| | | | |
|---|---|---|---|
| 2,441,719 A | 5/1948 | Potter | |
| 3,304,878 A | 2/1967 | Sabre | |

(Continued)

FOREIGN PATENT DOCUMENTS

| | | |
|---|---|---|
| DE | 29 31 164 A | 2/1981 |
| DE | 195 45 795 C1 | 3/1997 |

(Continued)

OTHER PUBLICATIONS

German Search Report—DE 10 2009 051 451.1-22—May 19, 2011.

(Continued)

*Primary Examiner* — Emmanuel M Marcelo
*Assistant Examiner* — Angela Caligiuri
(74) *Attorney, Agent, or Firm* — Brinks Gilson & Lione

(57) ABSTRACT

A piston for a pretensioner device (10) for a motor vehicle seat belt system of a type having a gas generator (17) with the piston (21) guided in a tube (16) that closes a pressure space (20) in the tube (16). The pressure space (20) can be pressurized by the gas generator (17), driving the piston (21) to undergo pretensioning operation transmitted to the seat belt system by a force transmission means. The piston has a dome shaped front side adapted to engage a force transmission element and a skirt forming a sealing lip oriented toward the pressure space. At least one slot is formed in the outer surface of the piston extending axially from the sealing lip. The slot can be enlarged by the material erosion caused by the pressure and/or pressure conditions in the pressure space produced by gas from the gas generator.

11 Claims, 7 Drawing Sheets

(56) References Cited

U.S. PATENT DOCUMENTS

| | | | |
|---|---|---|---|
| 3,965,802 | A | 6/1976 | Jacobs |
| 4,399,655 | A | 8/1983 | Föhl |
| 4,442,674 | A | 4/1984 | Fohl |
| 4,444,010 | A * | 4/1984 | Bendler ................ 60/407 |
| 4,860,698 | A | 8/1989 | Patrichi et al. |
| 5,037,134 | A | 8/1991 | Tabata |
| 5,641,131 | A | 6/1997 | Schmid |
| 5,690,295 | A | 11/1997 | Steinberg et al. |
| 5,842,344 | A | 12/1998 | Schmid |
| 5,956,954 | A | 9/1999 | Schmid |
| 6,325,416 | B1 | 12/2001 | Wier |
| 6,343,758 | B1 | 2/2002 | Abe et al. |
| 6,345,504 | B1 | 2/2002 | Takehara et al. |
| 6,363,722 | B1 | 4/2002 | Takehara et al. |
| 6,371,512 | B1 | 4/2002 | Asano et al. |
| 6,446,897 | B1 | 9/2002 | Arima et al. |
| 6,450,435 | B2 | 9/2002 | Junker et al. |
| 6,450,529 | B1 | 9/2002 | Kalandek et al. |
| 6,481,743 | B1 | 11/2002 | Tobe et al. |
| 6,575,498 | B2 * | 6/2003 | Nagata et al. ............ 280/806 |
| 6,722,600 | B2 | 4/2004 | Hamaue et al. |
| 6,808,199 | B2 | 10/2004 | Saderholm et al. |
| 6,830,262 | B2 | 12/2004 | Sonnenberg et al. |
| 6,910,653 | B2 | 6/2005 | Tanji |
| 7,401,805 | B2 | 7/2008 | Coon et al. |
| 7,661,705 | B2 | 2/2010 | Jacobsson et al. |
| 7,770,918 | B2 | 8/2010 | Berntsson et al. |
| 8,210,569 | B2 | 7/2012 | Eberle et al. |
| 8,262,008 | B2 | 9/2012 | Shiotani et al. |
| 8,371,613 | B2 | 2/2013 | Hodatsu et al. |
| 8,684,413 | B2 | 4/2014 | Fischer et al. |
| 2002/0134876 | A1 * | 9/2002 | Ono et al. ............ 242/374 |
| 2002/0180190 | A1 | 12/2002 | Tobe et al. |
| 2003/0010200 | A1 | 1/2003 | Reithofer |
| 2004/0007857 | A1 | 1/2004 | Sonnenberg et al. |
| 2006/0061071 | A1 | 3/2006 | Noguchi et al. |
| 2006/0119084 | A1 | 6/2006 | Coon et al. |
| 2006/0197316 | A1 | 9/2006 | Watanabe |
| 2006/0213191 | A1 | 9/2006 | Borg et al. |
| 2007/0251616 | A1 | 11/2007 | Furusawa et al. |
| 2007/0296189 | A1 | 12/2007 | Berntsson et al. |
| 2011/0140502 | A1 | 6/2011 | Shiotani |
| 2012/0211578 | A1 | 8/2012 | Fischer et al. |
| 2012/0256407 | A1 | 10/2012 | Tomita et al. |
| 2013/0038047 | A1 | 2/2013 | Schmidt et al. |
| 2013/0062450 | A1 | 3/2013 | Fischer et al. |

FOREIGN PATENT DOCUMENTS

| | | |
|---|---|---|
| DE | 196 02 549 A1 | 8/1998 |
| DE | 198 37 927 A1 | 3/2000 |
| DE | 199 39 499 A1 | 2/2001 |
| DE | 100 27 212 A1 | 12/2001 |
| DE | 102 12 912 A1 | 10/2002 |
| DE | 10331133 | 1/2004 |
| DE | 103 17 192 A1 | 12/2004 |
| DE | 10 2004 024 623 A1 | 12/2005 |
| DE | 10 2004 045 977 A1 | 3/2006 |
| DE | 102005011676 | 11/2006 |
| DE | 100 66 249 B4 | 7/2007 |
| DE | 102007028980 A1 | 1/2009 |
| DE | 102008032371 A1 | 9/2009 |
| DE | 10 2008 053 229 A1 | 5/2010 |
| EP | 0 780 272 A1 | 6/1997 |
| EP | 0 980 796 A2 | 2/2000 |
| EP | 1286866 A0 | 12/2001 |
| EP | 1637408 | 3/2006 |
| WO | WO 2009/079996 A2 | 7/2009 |

OTHER PUBLICATIONS

German Search Report—DE 10 2010 018 512.4—Jan. 18, 2011.
PCT/EP2008/004644—International Search Report—Dec. 31, 2008.
PCT/EP2010/006227—International Search Report—Jan. 21, 2011.
PCT/EP2010/007051—International Search Report—Mar. 10, 2011.
PCT/EP2011/001057—International Search Report—May 30, 2011.
PCT/EP2007/008243—International Search Report.
PCT/EP2007/010847 Initial Publication with International Search Report.
PCT International Search Report—Jan. 11, 2011.
German Search Report—Jun. 20, 2010.
U.S. Appl. No. 13/505,164, filed Apr. 30, 2012 (Assigned to Applicant).

* cited by examiner

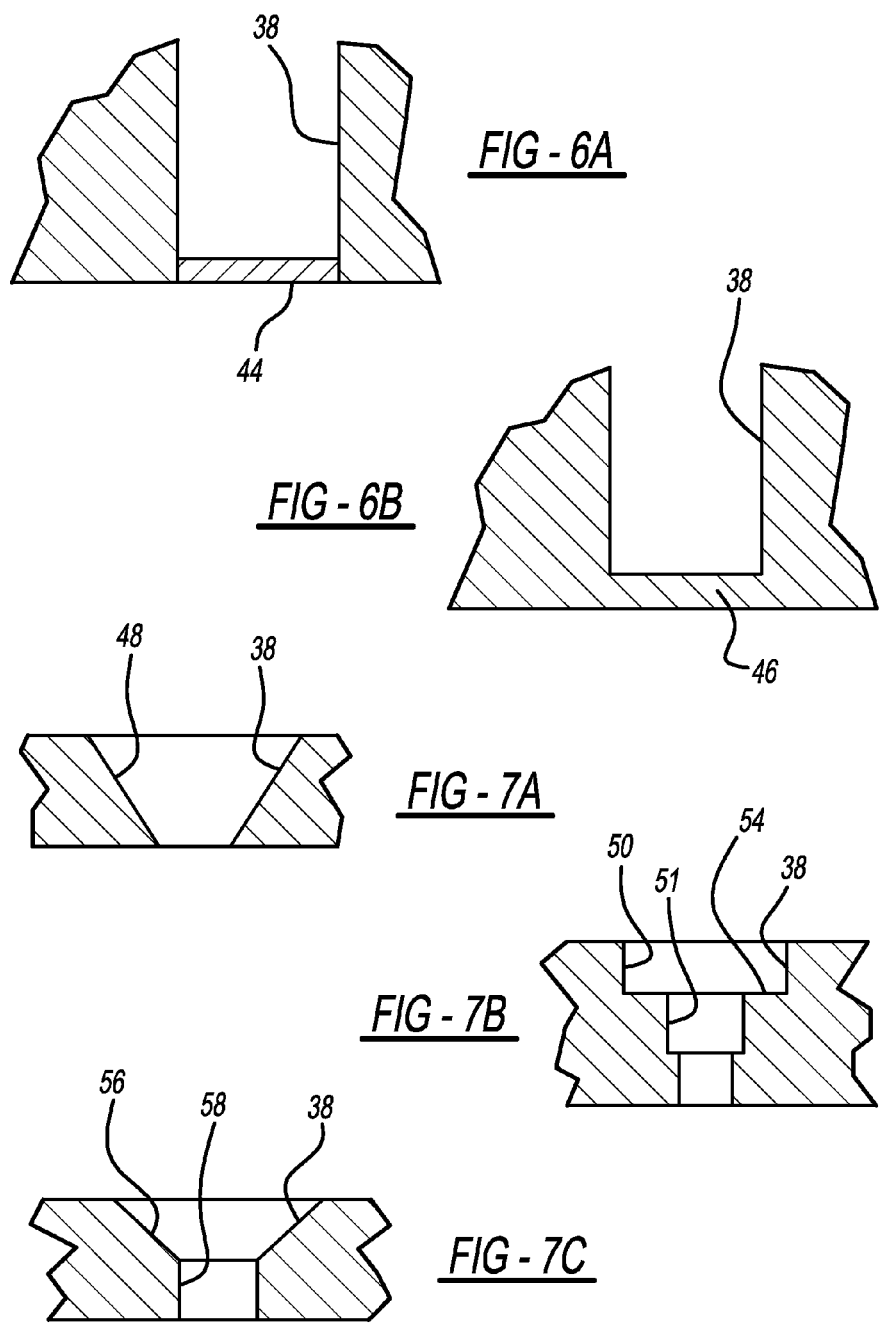

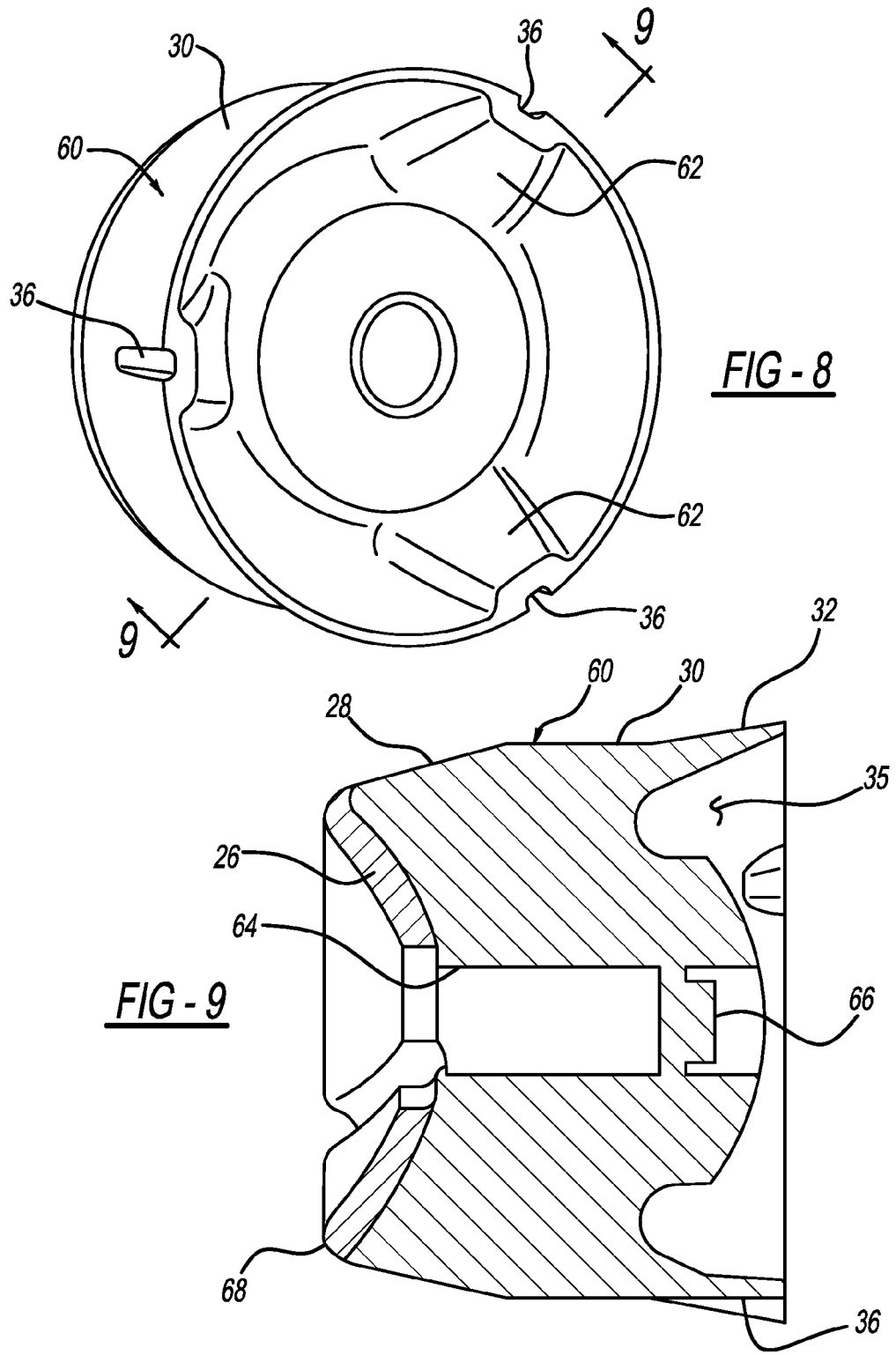

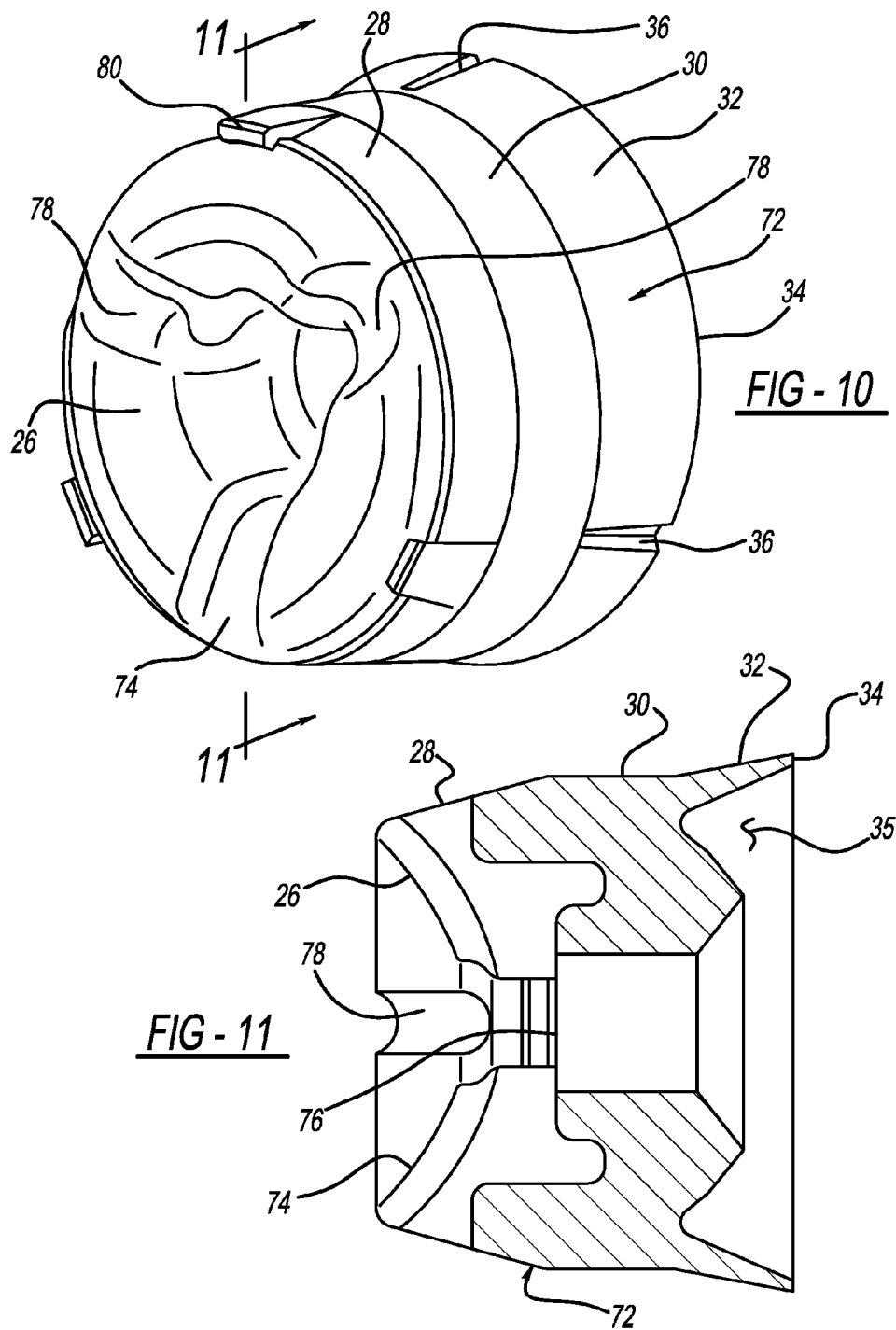

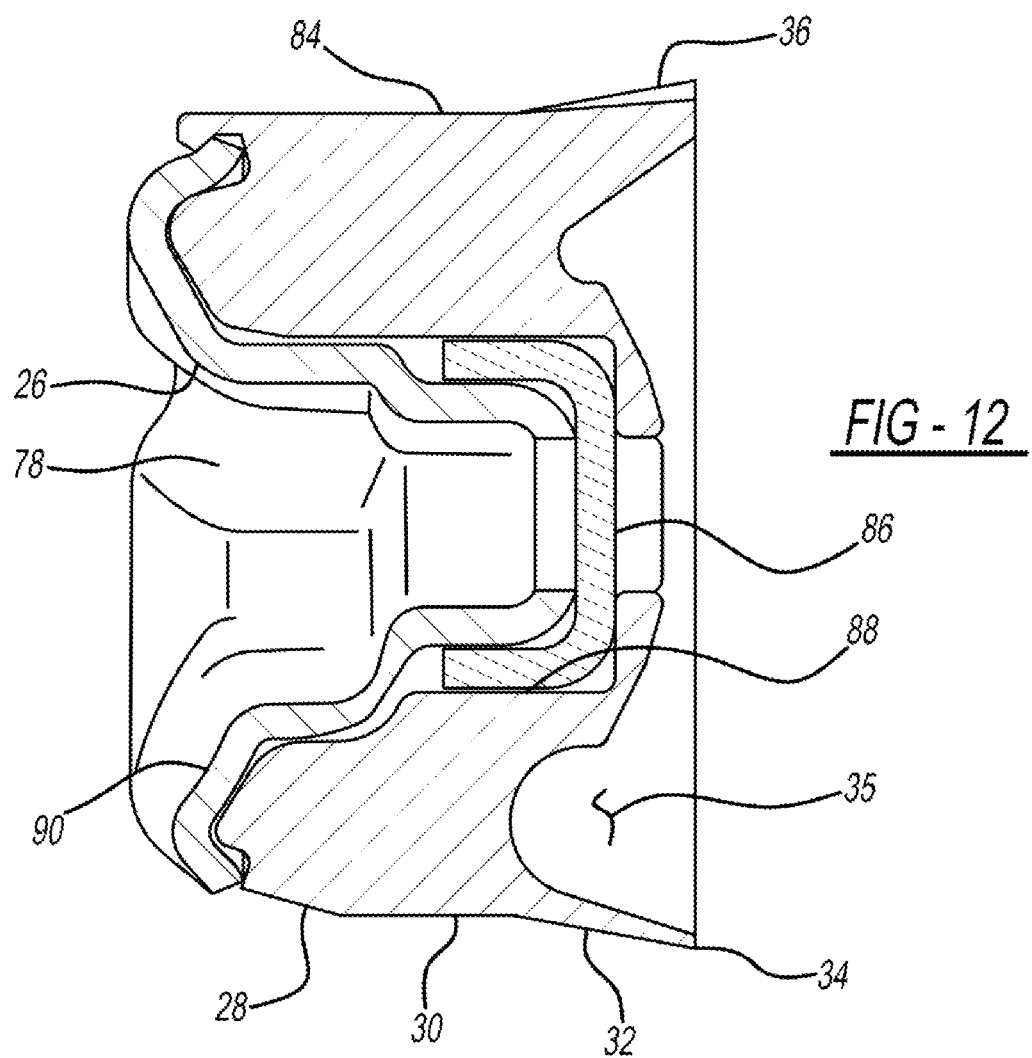

PRETENSIONER DEVICE FOR A SEAT BELT

CROSS-REFERENCE TO RELATED APPLICATIONS

This application is a continuation-in-part of U.S. patent application Ser. No. 13/505,164 filed on Apr. 30, 2012 which claims priority to German Patent Application No. 10 2009 051 451.1, filed Oct. 30, 2009 and PCT/EP2010/006227, filed Oct. 12, 2010.

FIELD OF THE INVENTION

The invention relates to a tensioning device for a seat belt, in particular in a motor vehicle. More particularly, this invention relates to a component of a pyrotechnically driven seat belt pretensioner such as a roto-pretensioner for a seat belt retractor.

BACKGROUND OF THE INVENTION

A problem with known seat belt retractor pretensioning devices of the pyrotechnically activated-type is that the pressure conditions during the pretensioning operation vary considerably. These systems use a pressure tube with a piston which drives a series of metal balls or a ball-chain arrangement into a sprocket which drives the retractor webbing spool. A pyrotechnic pressure generator can be activated to produce the gas pressure needed to drive the piston and produce the pretensioning rotation. During the activation sequence, very high pressure peaks can damage parts of the pretensioning device, or disturb the motion sequences of the pretensioner device. Furthermore, the problem is that, unless the safety belt is provided with a force limiting device, the belt force at the start of the force-limited belt extraction motion following the pretensioning operation increases for a short time to a force limiting level that is higher than that defined by the force limiting device due to the pressure still prevailing in the pretensioning device. This effect is generally designated as a force limiting disturbance. In order to prevent these disadvantages resulting from excessive pressure, different solutions have been devised to prevent pressure peaks and reduce the pressure following the pretensioning action of the safety belt as quickly as possible.

It is the object of the invention to provide a cost-effective and functionally reliable pretensioning device with a high tensioning performance in which excessive gas pressure is reduced in a simple manner.

SUMMARY OF THE INVENTION

The objects of the invention are attained by several embodiments of pretensioner devices with the characteristics described herein. Further preferred embodiments of the invention will be apparent from the figures as well as from the corresponding description.

To attain the objects, one embodiment of this invention proposes that the piston of a roto-pretensioner has a closed or constricted vent opening or slot along its side-wall, and that the opening can be enlarged and/or opened by erosion caused by the flow of gas from the gas generator and the resulting pressure and/or the flow conditions in the pressure space.

One feature of the proposed solution is that the vent opening is closed or has a constricted cross-section at the start of the pretensioning operation so that a high pretensioning force can be transmitted at that time. The opening is then further opened by the erosion effect from the pressure and/or the flow conditions prevailing in the pressure space during the pretensioning operation so that the pressure prevailing in the pressure space can escape through the open and/or enlarged opening in the piston. Owing to the open and/or enlarged opening, pressure peaks can be reduced without adversely affecting the pretensioning operation and the piston can be moved back in a reverse direction against the pretensioning motion after the pretensioning operation due to pressure venting without again increasing the belt force-limiting level. This reverse direction rotation results when load limiting force thresholds are reached and the retractor allows webbing extraction to control webbing loads.

According to the present invention, the effect of the material wear or erosion caused by gas flow is used for opening and/or enlarging the vent opening, with the advantage that during the pretensioning operation, the free cross-section of the opening is continuously enlarged and/or is still closed at the start of the pretensioning operation and is only enlarged during the pretensioning operation. It is thus possible to transmit a high pretensioning force at the start of the pretensioning operation and reduce the pressure prevailing in the pressure space at the end of the pretensioning operation as quickly as possible in order to prevent the destruction of the force limiter, and allow the reverse rotation mentioned previously. The material wear, or erosion of the piston vent opening is caused by the pressure and/or flow conditions prevailing in the pressure space so that the opening and/or enlargement of the opening is directly activated by the pretensioning device itself. In this connection, the nominal size of the opening and/or enlargement of the opening is directly related to the pressure, which ultimately results in the detrimental behavior of the pretensioning device in case of an excessive pressure increase. In case the pressure is substantially lower for some reason, that is, the disadvantages described above do not occur, the opening is not opened, or is opened to a lesser degree, since the erosive effect of gas flowing through the opening is reduced so that in this case the pretensioning force is still not unnecessarily reduced. The effect of the material erosion can also be supported by the prevailing temperature conditions and the particles resulting from the activation of the gas generator.

Several embodiments are described providing the features of the invention. In a first embodiment, a piston is provided having a single outside flow passage which is subject to the erosion effect mentioned above. In one alternate embodiment, a pressure relief passageway is provided. In a further alternate embodiment a piston is provided having three outside flow passages and a central overpressure burst disc area is formed. In another alternate embodiment, a two-part piston is provided. In a further embodiment, a multipiece assembly is provided having a metallic burst disc.

BRIEF DESCRIPTION OF THE DRAWINGS

The invention will be explained in more detail below by means of a preferred exemplary embodiment. The Figures specifically show:

FIG. 6A shows the piston opening with a thin partition across the opening made of a material that is different from that of the piston;

FIG. 6B shows the piston opening with a thin partition across the opening made of a material that is identical with the material of the piston;

FIG. 7A shows the vent opening with a conically flared cross-section;

FIG. 7B shows the vent opening with a cross-section flared by several cylindrical sections having different diameters;

FIG. 7C shows the vent opening with a cylindrical and a conically flared section.

FIG. 8 is a bottom perspective view of a piston in accordance with a third embodiment of the present invention;

FIG. 9 is a cross-sectional view taken along line and 9-9 from FIG. 8;

FIG. 10 is a pictorial view of a piston in accordance with a fourth embodiment of the present invention;

FIG. 11 is a cross-sectional view taken along line 11-11 from FIG. 10; and

FIG. 12 is a cross-sectional view through a piston in accordance with a fifth embodiment of the present invention.

DETAILED DESCRIPTION OF THE INVENTION

Figure 1:
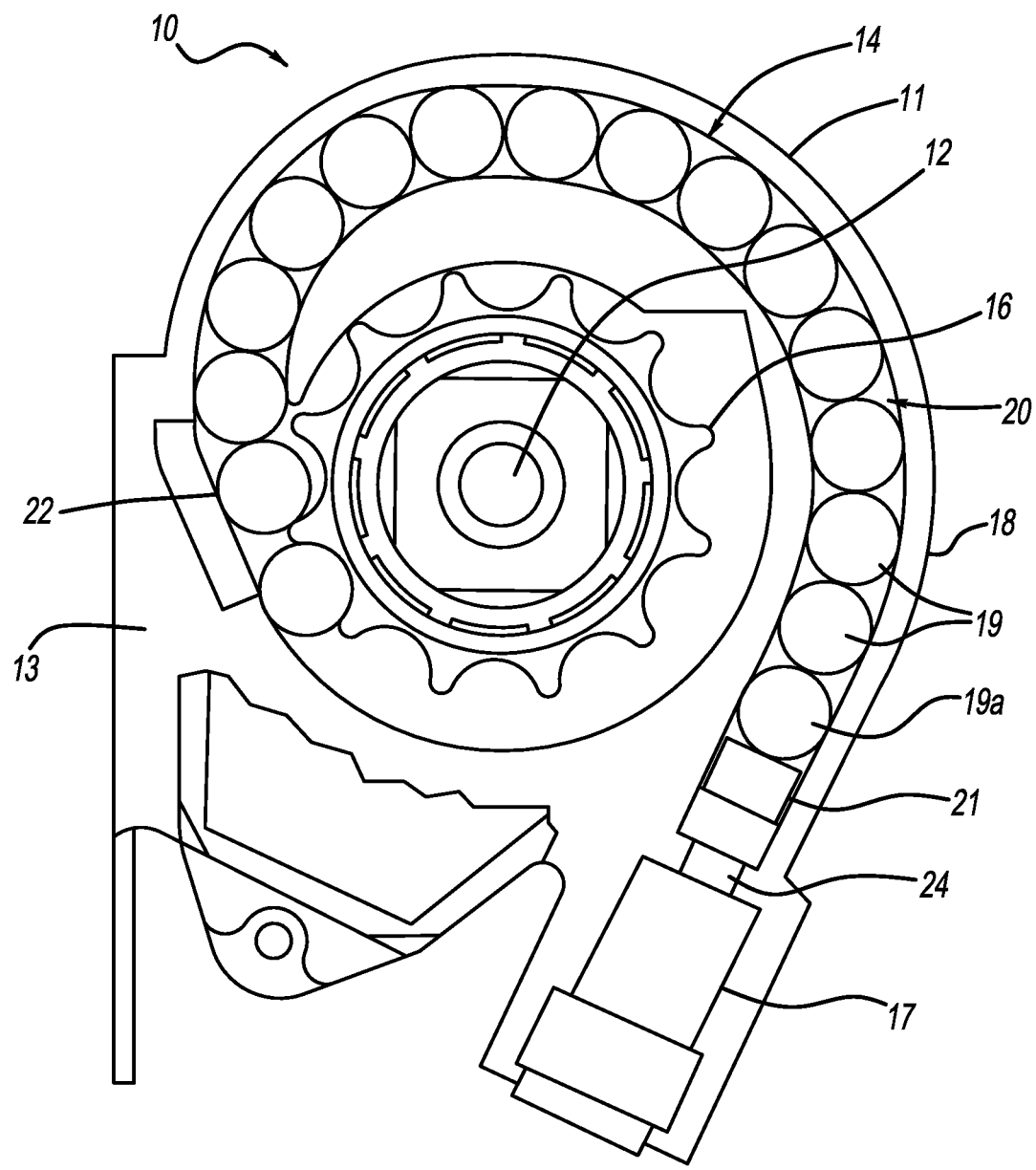
FIG. 1 is a side sectional view of a pretensioner device coupled to a belt retractor with a piston guided in a tube in accordance with this invention.

The belt retractor 10 schematically shown in FIG. 1 comprises a housing 11 with a side piece 13, a belt retractor shaft 12 for winding seat belt webbing, which is not shown, and a pretensioner device 14 acting on belt retractor shaft 12 after being activated. The pretensioner device 14 comprises a drive wheel or sprocket 16 connected in a torque transmitting manner to the belt retractor shaft 12, the drive wheel 16 having, for example, external teeth. The pretensioner device further includes a pyrotechnical gas generator 17 provided to generate activation gas pressure, and a tube 18 connecting the gas generator 17 to the belt retractor shaft 12 via the drive wheel 16. The tube 18 is formed by a tube wall 20 which is part of the housing 11, or alternatively may be provided as a separate component.

A series of balls 19, preferably made of metal is provided in the tube 18 to transmit the gas pressure generated by the gas generator 17 to the belt retractor shaft 12 via the drive wheel 16. The belt retractor 10 provides and an area of interaction 22 at which the series of balls 19 engages with the drive wheel 16. The outer diameter of the balls 19 is conveniently slightly smaller than the inner diameter of tube 18 to provide for low friction as the balls move within the tube during pretensioning operation.

A piston 21, which is only schematically indicated in FIG. 1, is provided and is conveniently arranged at a position between gas generator 17 and the series of balls 19, that is, directly in front of the first ball 19a of the series of balls 19. The piston 21 seals a pressure space 24 in the tube 18 which can be pressurized by the gas generator 17 so that it can be driven for pretensioning motion when the pressure space 24 is pressurized by the gas generator 17. The pretensioning motion of the piston 21 is transmitted by the force transmission means formed by the balls 19 through drive wheel 16 to the belt shaft 12 so that the seat belt webbing is pretensioned.

The pretensioner device 14 is described here as a belt retractor with a force transmission means consisting of a series of balls 19 and a drive wheel 16; other types of force transmission means would, however, also be conceivable, e.g. a rack-and-pinion drive or a cable drive. The invention is virtually applicable to all kinds of seatbelt webbing tensioning or pretensioning devices with a drive in the form of a piston-cylinder drive unit driven by gas pressure. The pretensioning device 14 can also be arranged on a belt buckle, webbing anchorage, or on an end fitting of a seat belt.

Figure 2:
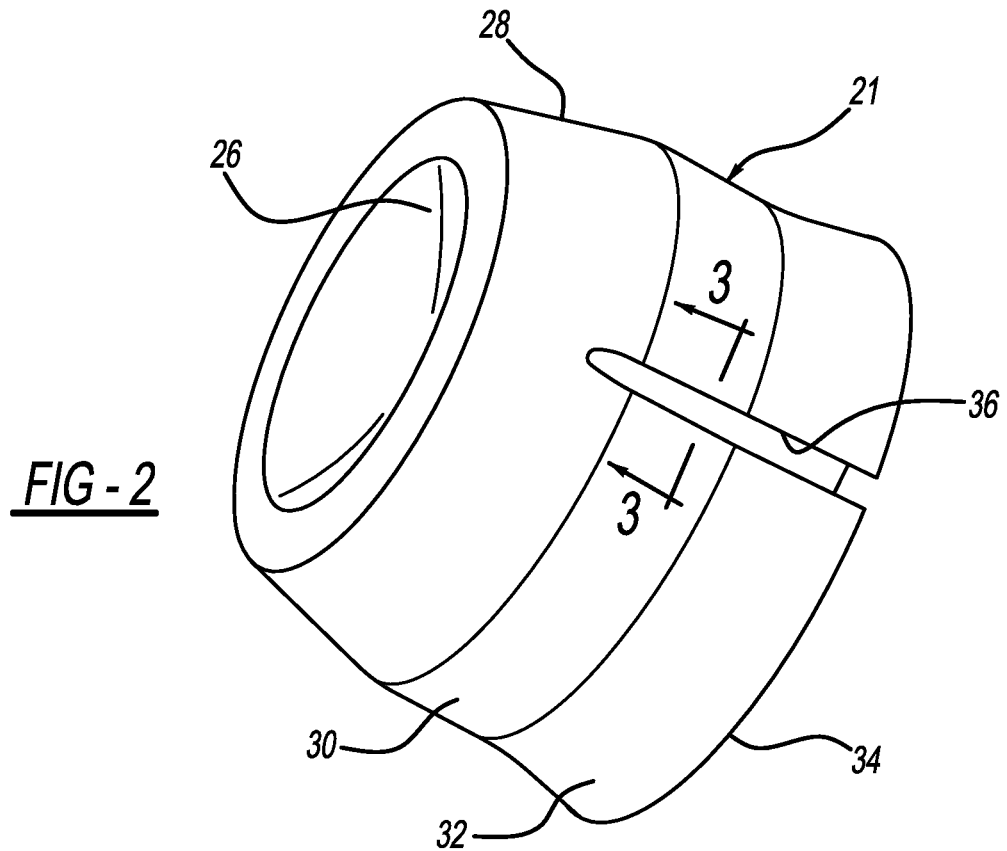
FIG. 2 is a perspective view which shows a piston in accordance with a first embodiment of the invention having a notch vent opening arranged on a lateral surface.

In FIG. 2, piston 21 is shown as an enlarged oblique view. Piston 21 has a dome-shaped front side 26 which serves as a contact surface for the first ball 19a. Starting at the front side 26, the surface of the piston 21 merges into first conical section 28, cylindrical middle section 30, and bottom section 32, which radially flares outwardly and ends at a circumferential sealing lip 34. Owing to the dome shape of the front side 26, the piston 21 contacts the first ball 19a with a preferably large surface area. Furthermore, the piston 21 can be differently oriented with respect to the first ball 19a without losing contact, so that there is a reliable contact of the piston 21 with the first ball 19a, even with geometry of tube 18 being bent. With the bottom section 32 flaring radially outward and due to the hollow region 35 at the base of the piston the pressure prevailing in the pressure space 24 during the pretensioner activation is in part transformed into an outward radial force acting on the sealing lip 34, such that the piston 21 contacts the inner side of the tube 18 via the sealing lip 34 with an increased sealing action.

As shown in FIG. 2, axially extending slot 36 is provided in the middle section 30 and bottom section 32 of the piston 21 in the form of a notch open to the outside. Importantly, slot 36 opens at sealing lip 34. The open side of the slot 36 is slightly closed at sealing lip 34 when the sealing lip contacts the inner side of the tube 18, resulting in that it nearly closed in the circumferential direction before pretensioner operation.

Figure 3:
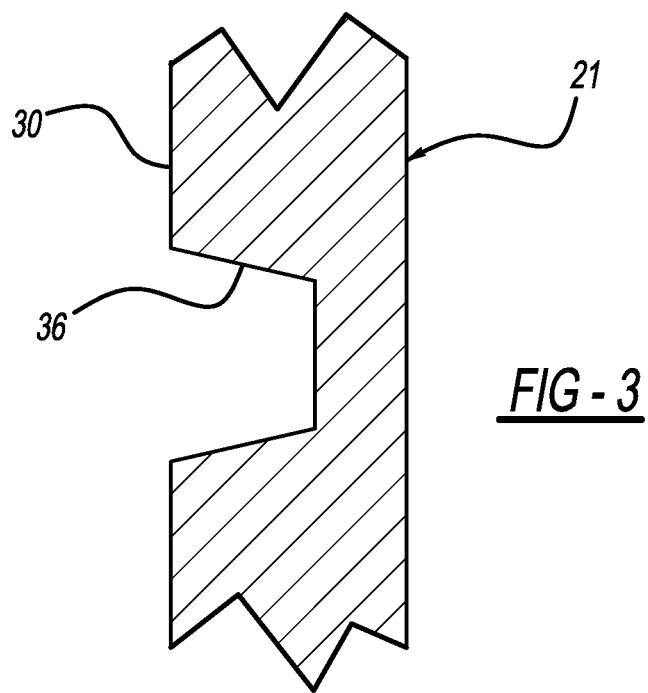
FIG. 3 is a cross-sectional view taken along line 3-3 from FIG. 2 showing the configuration of the vent notch.

FIG. 3 shows additional features of slot 36. As shown, slot 36 is an axially extending groove along the outside of piston 21. Slot 36 is cut partially into the radial thickness of piston middle section 30 and bottom section 32.

Figure 4:
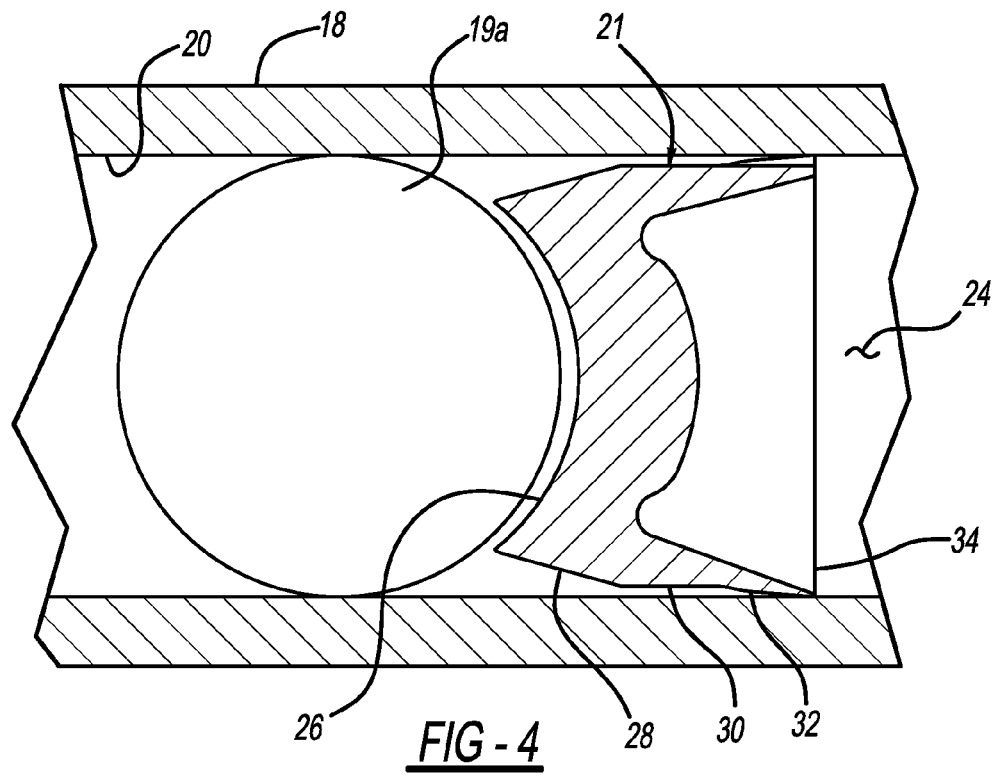
FIG. 4 is a cross-sectional view through the pretensioner tube showing the piston of FIG. 2 acting on a pretensioner ball.

FIG. 4 shows the interaction between piston 21 and the inside surface 20 of tube 18. As shown, first conical section 28 forms a decreasing radial clearance with the tube going from dome section 26 toward sealing lip 34. Middle section 30 forms a small radial clearance with the inside surface 20 of the pressure tube 18. Bottom section 32 is slightly compressed when installed within the inside surface 20 of tube 18 which provides an initial sealing force between sealing lip 34 and the tube. Piston 21 is preferably formed of a polymer resin material. As mentioned previously, upon the initiation of operation of pretensioner 14, gas from gas generator 17 is applied to pressure space 24. The cross-sectional area of slot 36 is at its smallest area prior to activating the pretensioner. High pressure applied in pressure space 24 causes the flow of gasses within slot 36 toward balls 19. If this flow reaches high rate levels attributed to extremely high pressure in the pressure space 24, the flow of the gasses through slot 36 will have an erosive effect on the material forming the piston 21. This effect increases the cross-sectional flow area of slot 36 to provide further over pressure regulation. Following the full extension of piston 21 within tube 18, the flow area formed by slot 36, whether or not enlarged by the erosive effect, is available to vent pressure space 24. This venting permits back-driving of piston 21, which is desirable in certain operating conditions of retractor 10. Accordingly the venting action of slot 36 prevents high pressure from being maintained in pressure space 24 after pretensioner activation.

Figure 5:
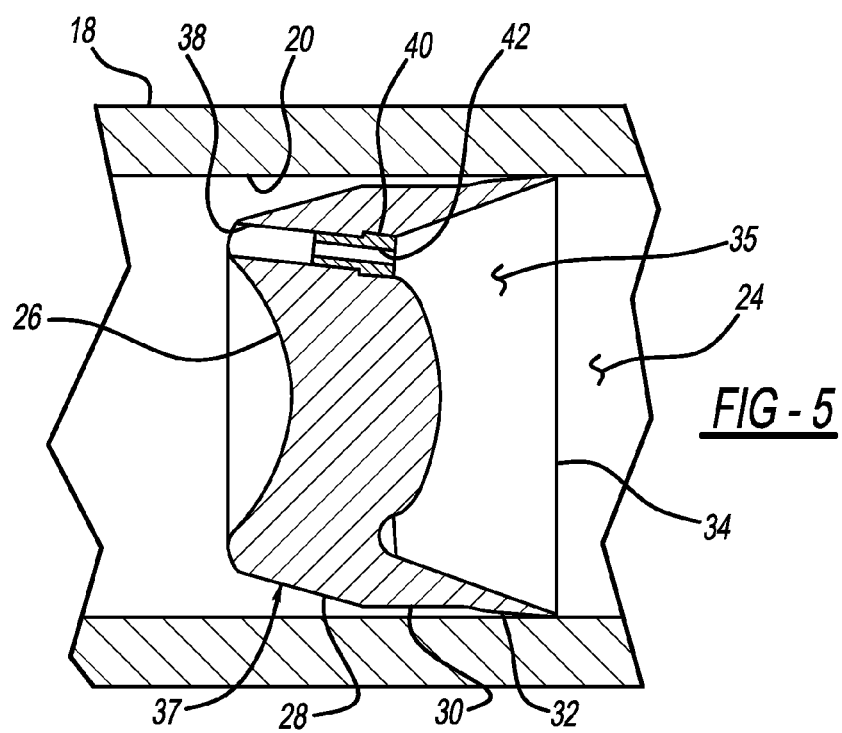
FIG. 5 is a cross-section of a piston in accordance with a second embodiment with an opening constricted by an insert.

FIG. 5 illustrates piston 37 having another possible shape of a venting arrangement in accordance with this invention. Features of piston 37 as well as Pistons described later in this specification having features identical to that of piston 21 are identified by like reference numbers. A description of these common features is provided previously. In the case of this embodiment the venting for piston 37 is configured as a through-opening 38. The opening 38 is in FIG. 5 constricted by insert 40 having a passageway 42 which provides a venting path. The material chosen for insert 40 may also be selected to permit the previously described erosion effect to take place. This will increase the cross-sectional flow area of passageway 42 upon high rates of gas flow through the passageway, providing the benefits discussed previously. In another configuration insert 40 may be formed of a metallic or another material which inherently resist the erosion effect.

The above described venting openings in the form of slot 36 and passageway 42 provide a permanent flow path for gases from gas generator 17 to flow around or across the piston 21 which serves to reduce pressure peaks acting on the piston during pretensioning operation. The embodiments of openings described in the following description of embodiments of the invention act to provide a leakage path only when an excessive or "overpressure" condition exists.

Further alternative embodiments of the invention can be seen in FIGS. 6A and 6B, where the through opening 38 is closed by thin partitions 44 and 46. Partition 44 being made of a different material than the piston 37 in the exemplary embodiment shown in FIG. 6A, and is made of a material that is identical to the material of the piston in the exemplary embodiment shown in FIG. 6B (it is integrally formed with the piston). The material of the partitions 44 and 46 closing the opening 38 should be selected according to the material abrasion to be achieved, where the opening process of the opening 38 can be influenced by the material abrasion caused by gas flow and also by the thickness of the partitions. When a designed overpressure condition exists across piston 37 partition 44 or 46 will fail, opening a vent flow path through opening 38.

Whether the through opening 38 is closed at the beginning of pretensioning operation as shown in FIGS. 6A and 6B, or permanently open, as shown in FIG. 5, different embodiments of the opening 38 with a cross-sectional area decreasing from the pressure space 24 can be seen in FIGS. 7A to 7C. In FIG. 7A, the opening 38 cross sectional shape is formed by a tapered cone 48. In the exemplary embodiment of FIG. 7B, the opening 38 is formed by two cylindrical bores 50 and 51 which form a ledge 54 at their junction. An opening 38 can be seen in FIG. 7C which is formed by a combination of a cone 56 and a cylindrical section 58. In these exemplary embodiments the area that is pressurized by the gas in pressure space 24 is reduced during the pretensioning operation by the cross-sectional area which decreases from the pressure space 24. Owing to this decrease in the cross-sectional area, the material abrasion along the opening 38 according to the present invention is also increased because the speed of the gas flow passing through the opening 38 in the constricted region increases.

A principal feature of some embodiments of the invention is that the opening 38 is opened and/or enlarged by means of the material abrasion owing to the pressure and/or the resulting flow conditions in the pressure space 24. The effect of the material abrasion is attributable to the fact that material is separated from the internal surface of the opening 38 by the pressure and/or flow conditions as well as by the temperature and by the particles generated during the activation of the gas generator 17. The effect of the material erosion can be influenced by the choice of the material of pistons 21 and 37, and by the cross-sectional shape and size of the opening 38. The opening 38 can be shut off by means of a blockage or be constricted by means of insert 40, whereas the piston 21 can incidentally be made of a harder material. In this case, the effect of the material abrasion is particularly strong in the region of the opening 38, whereas the piston 21 itself is not subject to any significant material abrasion.

Furthermore, the cross-section of the opening 38 can also have a different shape such as square, hexagonal of circular, as a result of which the material abrasion can be modified. The most important parameter for the material abrasion is the flow speed of the hot gases from gas generator 17 along the surface on which the material erosion will occur, which can be modified as such by the pressure because it is responsible for the resulting gas flow. The width of a normally open opening 38 or 42 is also critical because it determines the gas flow speed in the opening 38. In this case, it is possible that owing to a very high flow speed of gas in the opening 38, the material forming the opening 38 has to be selected even harder than the piston in order to limit the material abrasion. An example would be a small metal tube to form insert 40 which is inserted into the opening 38.

Unless the opening 38 is already open, or a constricted opening is already available at the start of the pretensioning operation, the opening acts as a nozzle, so that the gas at a high pressure in the pressure space 24 is accelerated when entering the opening. Owing to the high flow speed in the opening 38, its surfaces are eroded by the gas flow, with the gas flow speed in the opening causing a high surface stress and abrasion and thus the erosion of the surface of the material. The high velocity also provides the benefit that any particles produced by the gas generator or due to the erosion effect are quickly discharged and do not clog the opening. The flow in the opening 38 can be accelerated further by the decreasing cross-sectional area of the opening.

Now with reference to FIGS. 8 and 9, an alternate embodiment of piston 60 is illustrated. Piston 60 incorporates three separate slots 36 along its outer perimeter, being equally radially spaced apart. As best shown in FIG. 9 which shows the hollow region 35 of piston 60, the bottom section 32 area is locally thickened by ribs 62 to reinforce the skirt in the area of slots 36. This is desirable to allow for the erosion effect mentioned previously without causing failure of flared bottom section 32. As best shown in FIG. 8, piston 60 further includes the features of an overpressure burst disc-type relief in the form of central bore 64 which terminates at thin partition 66. A burst disc-type relief will fail at a predetermined pressure difference as described in connection with the features shown in FIGS. 6A and 6B discussed above.

With reference to FIG. 9, piston slots 36 extend only from the sealing lip 34 of the piston axially through the flared bottom section 30, determining at middle section 32. Upon encountering an overpressure condition, pressure in pressure space 24 can be partially vented by passing through slots 36. Depending on the flow rate of such gasses through slots 36, the erosion effect can be controlled. By providing three separate slots 36, any clogging of any one slot does not impair the pressure relieving functions of the other slots. Piston 60 is a composite structure which is formed by injection molding a polymer material. Cap 68 is bonded to the dome shaped front side 26.

Now with reference to FIG. 10, a further alternate embodiment of piston 72 is shown which is has features similar to piston 60 and is also a composite structure. In this instance, the insert or cap 68 forms a larger portion of the piston 72. In addition, cap 74 integrally forms a burst disc-type partition 76. FIG. 10 also illustrates that the cap 74, which forms the dome section 26, can have one or more radially extending troughs or grooves 78 which ensure that there is a gas flow path around ball 19a when it is seated against the dome surface. In this embodiment, piston 72 also forms a series of radially extending tabs 80 which are aligned with slots 36 which helps to serve to locate and orient piston 72 in its position and to facilitate movement through tube 18.

FIG. 12 illustrates piston 84 in accordance with a further alternate embodiment of the present invention. In this embodiment, piston 84 is a composite structure which includes an insert molded or assembled metal burst disc 86 present within the central passageway 88. In this embodiment, piston 84 also utilizes a metallic cap 90 which forms the dome-shaped front side 26 of the piston. Piston 84 also provides the radially spaced slots 36 as described in connection with the prior embodiments.

While the above description constitutes the preferred embodiment of the present invention, it will be appreciated that the invention is susceptible to modification, variation, and change without departing from the proper scope and fair meaning of the accompanying claims.

The invention claimed is:

1. A piston for a pretensioner device (10) for a motor vehicle seat belt system, the pretensioning device of a type having a gas generator (17) with the piston (21) guided in a tube (16) that closes a pressure space (20) in the tube (16), whereas the pressure space (20) is pressurized by the gas generator (17), as a result of which the piston (21) is driven to undergo pretensioning operation which is transmitted to the seat belt system by a force transmission means, the piston comprising:

the piston having a dome shaped front side adapted to engage a force transmission element and having a skirt forming a sealing lip adapted to be oriented toward the pressure space, at least one slot formed in the outer surface of the piston and through the sealing lip, the slot extending axially from the sealing lip along the outer surface, the piston having a material adjoining the slot that leads to an enlargement of the slot by material erosion caused by the pressure and/or pressure conditions in the pressure space produced by gas from the gas generator.

2. The piston of claim 1 further comprising the piston further forming a conical section extending from the front side, a middle section having a cylindrical configuration and having a diameter closely fitting within the tube, and a flared bottom section terminating at the sealing lip.

3. The piston of claim 2 further comprising the slot extending from the sealing lip, along the bottom end, and terminating at the middle section.

4. The piston of claim 2 further comprising the piston having a hollow region adjacent the bottom and the sealing lip.

5. The piston of claim 4 further comprising the piston bottom and forming a reinforcing rib in the region of the slot.

6. The piston of claim 2, wherein the skirt of the piston is thickened in an area adjoining the at least one slot.

7. The piston of claim 2, wherein the piston has a radial thickness and the at least one slot is cut partially into the radial thickness of the flared bottom section.

8. The piston of claim 1 further comprising the piston forming three of the slots oriented at equal radial relative positions.

9. The piston of claim 1 further comprising the slot forming a venting passageway along the outside of piston and wherein the slot is open to permit flow of the gas during pretensioning operation.

10. The piston of claim 1 further comprising a passageway within the piston extending between the pressure space to the front side, a partition blocking the passageway in a normal condition and failing to open the passageway, and, upon an overpressure condition occurring in the pressure space, opening the passageway to vent pressure in the pressure space.

11. The piston of claim 1 further comprising the force transmission element in the form of at least one ball.

* * * * *